United States Patent
Huang et al.

(10) Patent No.: US 11,631,147 B2
(45) Date of Patent: Apr. 18, 2023

(54) SOCIAL RECOMMENDATION METHOD BASED ON MULTI-FEATURE HETEROGENEOUS GRAPH NEURAL NETWORKS

(71) Applicant: Jinan University, Guangzhou (CN)

(72) Inventors: Feiran Huang, Guangzhou (CN);
Zhiquan Liu, Guangzhou (CN);
Yuanchen Bei, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 0 days.

(21) Appl. No.: 17/846,058

(22) Filed: Jun. 22, 2022

(65) Prior Publication Data
US 2022/0414792 A1 Dec. 29, 2022

(30) Foreign Application Priority Data
Jun. 24, 2021 (CN) .......................... 202110701053.6

(51) Int. Cl.
*G06Q 50/00* (2012.01)
*G06N 3/063* (2023.01)

(52) U.S. Cl.
CPC .............. *G06Q 50/01* (2013.01); *G06N 3/063* (2013.01)

(58) Field of Classification Search
None
See application file for complete search history.

(56) References Cited

U.S. PATENT DOCUMENTS

| | | | |
|---|---|---|---|
| 2017/0185666 A1* | 6/2017 | Pasternack | G06F 16/951 |
| 2018/0336457 A1* | 11/2018 | Pal | G06N 3/045 |
| 2019/0286659 A1* | 9/2019 | Leskovec | G06F 18/29 |
| 2019/0332946 A1* | 10/2019 | Han | G06Q 30/0241 |

(Continued)

OTHER PUBLICATIONS

Q. Fang, J. Sang, C. Xu and Y. Rui, "Topic-Sensitive Influencer Mining in Interest-Based Social Media Networks via Hypergraph Learning," in IEEE Transactions on Multimedia, vol. 16, No. 3, pp. 796-812, Apr. 2014, doi: 10.1109/TMM.2014.2298216. (Year: 2014).*

(Continued)

*Primary Examiner* — Laura Yesildag
(74) *Attorney, Agent, or Firm* — WPAT, PC

(57) ABSTRACT

A social recommendation method based on a multi-feature heterogeneous graph neural network is provided and includes: extracting attribute information of users and topics to code; processing user coding information and topic coding information through a multi-layer perceptron to obtain initial feature vectors of the users and the topics; establishing a heterogeneous graph by taking the users and the topics as nodes; inputting the heterogeneous graph into a heterogeneous graph neural network to perform information transmission in combination with an attention mechanism, and updating the feature vectors; and performing similarity calculation on the feature vectors of the users, and selecting the user and the topic with the highest similarity with the feature vector of the user for recommendation. Social information can be mined more comprehensively, features of users and interested topics of the users can be deeply fused, and recommendation accuracy and user experience can be improved.

8 Claims, 3 Drawing Sheets

(56) References Cited

U.S. PATENT DOCUMENTS

2020/0074335 A1* 3/2020 Flinn ................ G06F 16/24575

OTHER PUBLICATIONS

Y. Xiao, H. Yu, Q. Li, L. Liu, M. Xu and H. Xiao, "MPURank: A Social Hotspot Tracking Scheme Based on Tripartite Graph and Multimessages Iterative Driven," in IEEE Transactions on Computational Social Systems, vol. 6, No. 4, pp. 715-725, Aug. 2019, doi: 10.1109/TCSS.2019.2922431. (Year: 2019).*

P. Ahale, T. Pattanshetti and S. Nayak, "Effectiveness of Graph Neural Networks for User-User-Item Recommendation Systems," 2021 Third International Conference on Inventive Research in Computing Applications (ICIRCA), Coimbatore, India, 2021, pp. 1527-1532, doi: 10.1109/ICIRCA51532.2021.9545053. (Year: 2021).*

* cited by examiner

SOCIAL RECOMMENDATION METHOD BASED ON MULTI-FEATURE HETEROGENEOUS GRAPH NEURAL NETWORKS

TECHNICAL FIELD

The disclosure relates to the field of data mining and information recommendation technologies, particular to a social recommendation method based on a multi-feature heterogeneous graph neural network.

BACKGROUND

In recent years, with rapid development of internet information technologies and ancillary industries thereof, internet services and transactions have become more and more popular, and people are more and more inclined to use the internet for social activities. Due to a large number of users, social networks generate a large amount of user behavior information every day, such as mutual attention, comments, likes and exchanges on topics of common interest, resulting in information overload, which provides users with rich information, but inevitably makes the users spend a lot of time on a large number of information that they are not interested in. Therefore, the information overload is both a challenge and an opportunity for users and social platforms. The emergence of a recommendation system provides a solution for mining information of interest to users from a large amount of data information, which can save users' time, improve user experience, increase the stickiness of the platform to the user, and improve user satisfaction and platform revenue. Therefore, using an effective recommendation system technology to extract information of interest from a large number of user interaction information and recommend it to the user is of great value to the user and social networking platforms, and thereby the social recommendation system has become a hot research direction.

In the existing social recommendation system technologies, most of them only consider a part of the sparse information (such as users' attention, comments, likes and other interactive behaviors), and do not consider the impact of the joint action of multiple factors on the recommendation system, which will lead to insufficient information mining on social networks. In addition, most of the current technologies only focus on user interaction or topics of interest to users, which will also lead to the loss of information and have certain limitations.

SUMMARY

In order to overcome defects and shortcomings of the existing technology, the disclosure provides a social recommendation method based on a multi-feature heterogeneous graph neural network, which extracts a variety of features of users and topics, establishes a heterogeneous graph for the users and the topics at the same time, comprehensively mines interactive information of a social network, and deeply integrates the features of the users and their interest topics, so as to obtain a more accurate social recommendation effect and improve the user experience.

In order to achieve the above purpose, the disclosure provides the following solutions.

A social recommendation method based on a multi-feature heterogeneous graph neural network, includes:

extracting attribute information of users and attribute information of topics at the same time, and coding the attribute information of the users and the attribute information of the topics to obtain multi-feature codes of the users and multi-feature codes of the topics;

inputting the multi-feature codes of the users and the multi-feature codes of the topics into different multi-layer perceptron to train at the same time, and outputting initial feature vectors of the users and initial feature vectors of the topics;

taking the users and the topics on a social network as nodes, performing a user-user edge linking based on network social interactions of the users, performing a user-topic edge linking based on the topics of interest to the users, performing normalization on weights of user-user edges after calculating the weights of the user-user edges, and performing normalization on weights of user-topic edges after calculating the weights of the user-topic edges; and outputting a heterogeneity graph;

building a heterogeneous graph neural network model;

inputting the heterogeneous graph into the heterogeneous graph neural network model, and calculating attention scores of user type neighbor nodes and attention scores of topic type neighbor nodes by using different attention vectors respectively;

performing normalization on the attention scores of the user type neighbor nodes and the attention scores of the topic type neighbor nodes respectively and then performing normalization together to obtain attention scores of a neighbor node set of a central node;

performing feature transfer on each of neighbor nodes of the neighbor node set of the central node based on the attention score of each of the neighbor nodes of the neighbor node set and then performing information aggregation together with features of the central node to update a feature representation of the central node, and outputting updated vector representations of the users and the topics after the information aggregation through the heterogeneous graph neural network;

calculating feature vector similarity between a recommended target user and each of the users, and feature vector similarity between the target user and each of the topics, selecting one of the users with a highest similarity and one of the topics with a highest similarity after sorting the feature vector similarity to recommend to the target user.

In an embodiment, the coding the attribute information of the users and the attribute information of the topics includes:

coding semantic information related to natural language by using a word2vec method, including: noise information removal, word segmentation and stop word processing, training word representations of numerical vectorization and obtaining embedding coding representations of the semantic information; and performing one-hot coding on data represented by discrete values.

In an embodiment, a calculation formula for each layer of the multi-layer perceptron is that:

$$H^{(l)} = \emptyset(W^{(l)} \cdot H^{(l-1)} + b^{(l)});$$

where $H^{(l)}$ represents an output vector of a lth layer; $W^{(l)}$ represents a trainable weight matrix of the lth layer; $b^{(l)}$ represents a bias vector of the lth layer; $H^{(l-1)}$ represents an output vector of a (l–1)th layer, and when l=1, $H^{(l-1)}$ represents the multi-feature codes of the users and the multi-feature codes of the topics; and ø represents an activate function.

In an embodiment, the performing a user-user edge linking based on network social interactions of the users, includes:

when two of the users have carried out the network social interactions, performing the user-user edge linking on the two of the users; the network social interactions including at least one of interactions of attentions, likes and comments; and the weight of the user-user edge between the two of the users being initialized to a number of times of the network social interactions between the two of the users.

In an embodiment, the performing a user-topic edge linking based on the topics of interest to the users, includes:

when one of the users has paid attention to and commented on one of the topics, performing the user-topic edge linking on the one of the users and the one of the topics; and the weight of the user-topic edge between the one of the users and the one of the topics being initialized to a number of times that the one of the users pays attention to and comment on the one of the topics.

In an embodiment, the calculating attention scores of user type neighbor nodes and attention scores of topic type neighbor nodes by using different attention vectors respectively through calculation formulas as follows:

$a_{vv_{user}} = \theta(\mu_u^T \cdot [h_v \| h_{v_{user}}]), v_{user} \in N_v$, and $v_{user}$ represents one of the user type neighbor nodes;

$a_{vv_{topic}} = \theta(\mu_u^T \cdot [h_v \| h_{v_{topic}}]), v_{topic} \in N_v$, and $v_{topic}$ represents one of the topic type neighbor nodes;

where v represents the central node of the information aggregation, $N_v$ represents the neighbor node set of v, $a_{vv_{user}}$ represents the attention score of one of the user type neighbor nodes, $a_{vv_{topic}}$ represents the attention score of one of the topic type neighbor nodes, $\mu_u^T$ represents a transpose of a learnable attention weight vector of one of the user type neighbor nodes, $\mu_t^T$ represents a transpose of a learnable attention weight vector of one of the topic type neighbor nodes, $h_v$ represents a feature vector of the central node, $h_{v_{user}}$ represents a feature vector of one of the user type neighbor nodes, $h_{v_{topic}}$ represents a feature vector of one of the topic type neighbor nodes, σ represents an activate function, $v_{user}$ represents one of the user type neighbor nodes in the neighbor node set of v, and $v_{topic}$ represents one of the topic type neighbor nodes in the neighbor node set of v.

In an embodiment, the performing normalization on the attention scores of the user type neighbor nodes and the attention scores of the topic type neighbor nodes respectively and then performing normalization together to obtain attention scores of a neighbor node set of a central node through calculation formulas as follows:

$$\theta_{vv_{user}} = \frac{\exp(a_{vv_{user}})}{\sum\limits_{i \in N_v \text{ and } i \text{ represents a user node}} \exp(a_{vi})},$$

$v_{user} \in N_v$ and $v_{user}$ represents one of the user type neighbor nodes;

$$\theta_{vv_{topic}} = \frac{\exp(a_{vv_{topic}})}{\sum\limits_{j \in N_v \text{ and } j \text{ represents a topic node}} \exp(a_{vj})},$$

$v_{topic} \in N_v$ and $v_{topic}$ represents one of the topic type neighbor nodes;

$$\theta_{vv'} = \frac{\exp(\theta_{vv'})}{\sum\limits_{k \in N_v} \exp(\theta_{vk})},$$

and $v' \in N_v$;

where θ represents the attention score after the normalization by a softmax function, v represents the central node of the information aggregation, $N_v$ represents the neighbor node set of v, v' represents a neighbor node of v, $\theta_{vv'}$ represents a value of a vth row and v'th column of an attention score matrix, $a_{vv_{user}}$ represents the attention score of one of the user type neighbor nodes, $a_{vv_{topic}}$ represents the attention score of one of the topic type neighbor nodes, $\theta_{vv_{user}}$ represents the attention score of a target user type neighbor node after the normalization, $\theta_{topic}$ represents the attention score of a target topic type neighbor node after the normalization, $a_{vi}$ represents the attention score of one of the user type neighbor nodes before the normalization, $a_{vj}$ represents the attention score of one of the topic type neighbor nodes before the normalization, k represents a node of the neighbor node set of v, i represents the user type neighbor node of the neighbor node set of v, j represents the topic type neighbor node of the neighbor node set of v, and $\theta_{vk}$ represents the attention score of the neighbor node after the normalization.

In an embodiment, the performing feature transfer on each of neighbor nodes of the neighbor node set of the central node based on the attention score of each of the neighbor nodes of the neighbor node set and then performing information aggregation together with features of the central node to update a feature representation of the central node through a calculation formula as follows:

$h_i^{(l+1)} = \theta(\Sigma_{j \in N(i)} \theta_{ij} \cdot h^{(l)} \cdot W^{(l)})$;

where $h_i^{(l+1)}$ represents a feature vector of the central node i in a node feature matrix of a (i+1)th layer of the heterogeneous graph neural network, $h^{(l)}$ represents a node feature matrix obtained by a ith layer of the heterogeneous graph neural network, $W^{(l)}$ represents a trainable weight matrix of the ith layer of the heterogeneous graph neural network, $\theta_{ij}$ represents the attention score of the central node i and a neighbor node j, σ a represents an activate function, and N (i) represents the neighbor node set of the central node i.

In an embodiment, the heterogeneous graph neural network model is jointly trained with the multi-layer perceptron to share a back propagation loss in a training process and update parameters at the same time; and wherein feature vectors of each of user nodes and each of topic nodes after the feature transfer and the information aggregation through a multi-layer heterogeneous graph neural network are updated into a user and topic database.

The disclosure further provides a social recommendation system based on a multi-feature heterogeneous graph neural network, including: an information extracting module, a coding module, an initial feature vector outputting module, a heterogeneity graph building module, a heterogeneous graph neural network model building module, an attention score calculating module, an attention score synthesis calculating module, an information aggregation and updating module, a feature vector similarity calculating module, and a recommend result outputting module;

the information extracting module is configured to extract attribute information of users and attribute information of topics;

the coding module is configured to code the attribute information of the users and the attribute information of the topics;

the initial feature vector outputting module is configured to output initial feature vectors, input multi-feature codes of the users and multi-feature codes of the topics after the coding into different multi-layer perceptron to train, and output initial feature vectors of the users and initial feature vectors of the topics;

the heterogeneity graph building module is configured to building a heterogeneity graph by taking the users and the topics on a social network as nodes, performing a user-user edge linking based on network social interactions of the users, performing a user-topic edge linking based on the topics of interest to the users, performing normalization on weights of user-user edges after calculating the weights of the user-user edges, and performing normalization on weights of user-topic edges after calculating the weights of the user-topic edges, and output the heterogeneity graph;

the heterogeneous graph neural network model building module is configured to build a heterogeneous graph neural network model;

the attention score calculating module is configured to input the heterogeneous graph into the heterogeneous graph neural network model, and calculate attention scores of user type neighbor nodes and attention scores of topic type neighbor nodes by using different attention vectors respectively;

the attention score synthesis calculating module is configured to perform normalization on the attention scores of the user type neighbor nodes and the attention scores of the topic type neighbor nodes respectively and then perform normalization together to obtain attention scores of a neighbor node set of a central node;

the information aggregation and updating module is configured to perform feature transfer on each of neighbor nodes of the neighbor node set of the central node based on the attention score of each of the neighbor nodes of the neighbor node set and then perform information aggregation together with features of the central node to update a feature representation of the central node, and output updated vector representations of the users and the topics after the information aggregation through the heterogeneous graph neural network;

the feature vector similarity calculating module is configured to calculate feature vector similarity between a recommended target user and each of the users, and feature vector similarity between the target user and each of the topics; and the recommend result outputting module is configured to output recommend results of one of the users with a highest similarity and one of the topics with a highest similarity after sorting the feature vector similarity.

Compared with the prior art, the disclosure has the following advantages and beneficial effects:

(1) The disclosure pays attention to behavior features of the users in the social network, and considers the influence of the joint action of the multiple factors and features of users and topics in the social network on the recommendation system, so as to more comprehensively mine the social network information of users.

(2) The disclosure takes the users and the topics as nodes to establish the heterogeneous graph at the same time, carries out information transmission and aggregation through the heterogeneous graph neural network, fits the real structure of the real social network, pays attention to user interaction and topics of interest to users, deeply integrates the features of users and their topics of interest, and improves the accuracy of recommendation and user experience.

DETAILED DESCRIPTION OF THE EMBODIMENTS

In order to make objects, technical schemes and advantages of the disclosure more clear, the disclosure is further described in detail below in combination with the accompanying drawings and embodiments. It should be understood that the specific embodiments described herein are only used to explain the disclosure and are not used to define the disclosure.

Embodiment 1

Figure 1:
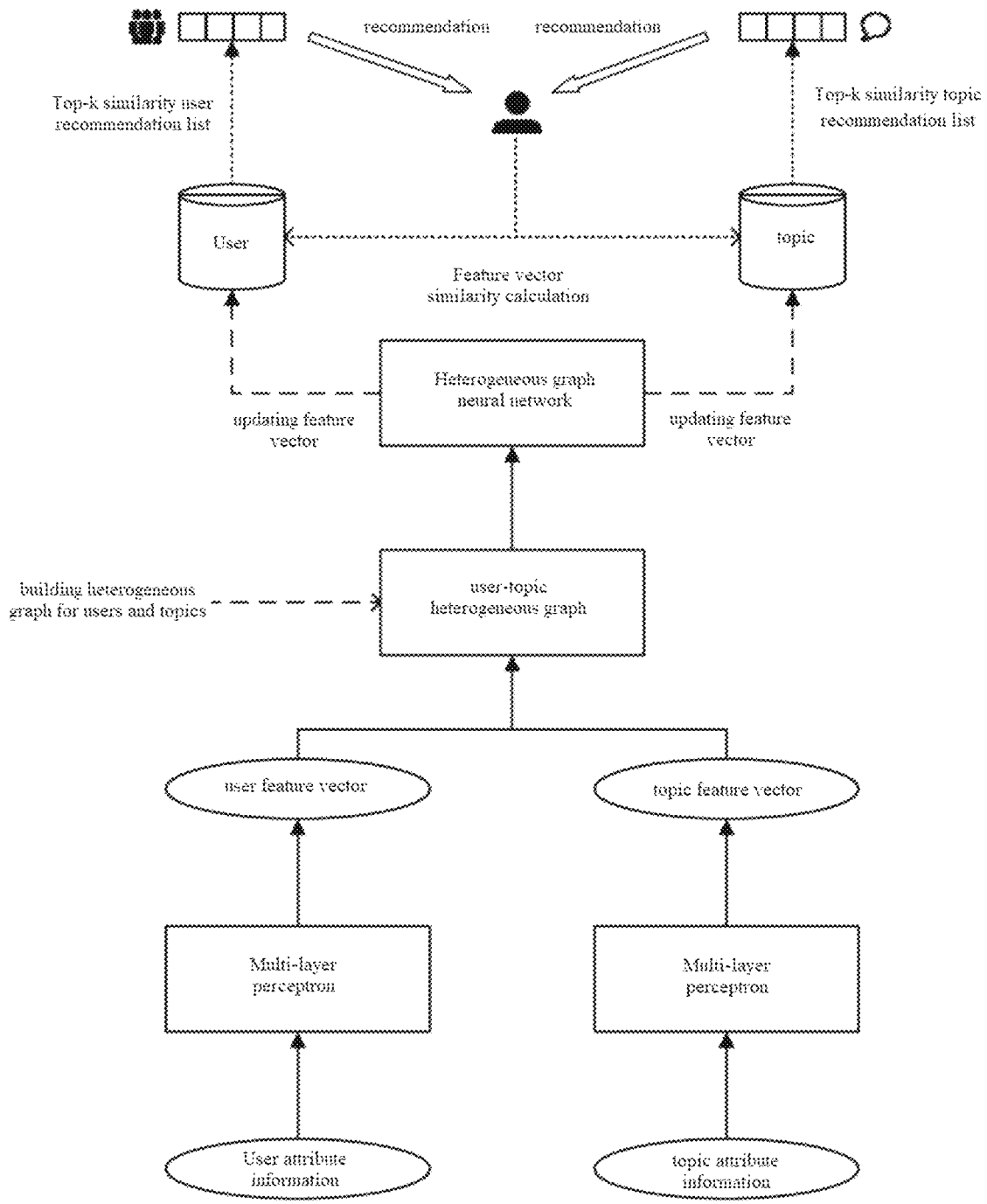
FIG. 1 illustrates a schematic flowchart of a social recommendation method based on a multi-feature heterogeneous graph neural network of the disclosure.

As illustrated in FIG. 1, the embodiment of the disclosure provides a social recommendation method based on a multi-feature heterogeneous graph neural network, including the step S1 to the step S4.

At the step S1, extracting and processing attribute information of users and topics.

The attribute information (such as nickname, age, city, etc.) of the users and the attribute information (such as theme, heat (also referred to as popularity), profile, etc.) of the topics are extracted at the same time, which involves semantic information of natural language, a word to vector (word2vec) method is used to code the semantic information to obtain embedding feature codes, and the other data represented by discrete values can be one-hot coded.

The extracting and processing the attribute information of the users and the topics in the embodiment can include step S1.1 to step S1.3.

At the step S1.1, multi-feature extraction.

The attribute information (such as nickname, age, city, etc.) of the users of a social platform and the attribute information (such as theme, heat, profile, etc.) of the topics are preliminarily extracted at the same time.

At the step S1.2, embedding feature coding.

For the extracted attribute information, if the extracted attribute information involves the semantic information (such as user nickname, topic profile, etc.) of the natural language, a natural language processing method is used to obtain the feature codes. The specific steps are as follows: first, processing the semantic data, including noise information removal, word segmentation and stop word processing, training word representations of numerical vectorization and obtaining embedding coding representations of the semantic information.

The noise information removal includes: processing the semantic information through a regular expression to filter irrelevant noise information, such as URLs, garbled characters, etc.

The word segmentation and stop word processing includes: for the semantic information after the noise information is removed, a word segmentation tool is used to segment words, and a text sequence is converted into a corresponding word list after the word segmentation; for the corresponding word list after the word segmentation, stop words are processed through a stop word list to obtain a word list after the stop words are removed.

The training word representations of numerical vectorization, includes: according to a word group obtained by the word segmentation according to the semantic information, an initial word embedding vector of the word list corresponding to the semantic information is trained by using the word2vec neural network feature embedding method, and then the word embedding vector fused with the word position information is obtained by adding the position vector representing the word position to each word vector.

The obtaining embedding coding representations of the semantic information, includes: performing a mean-pooling on the word vectors of each word contained in the semantic information, and obtaining the embedding coding representation of the semantic information.

At the step S1.3, one-hot feature coding.

For the extracted attribute information, one-hot coding is performed on the data (such as age, city, etc.) that can be represented by discrete values. For example, if the age of the user group on the social network is 20-24 years old, for a 21-year-old user, the one-hot feature coding of the age is represented by [0,1,0,0,0].

At the step S2, obtaining initial feature vectors (also referred to as eigenvectors) of the users and initial feature vectors of the topics.

Figure 2:
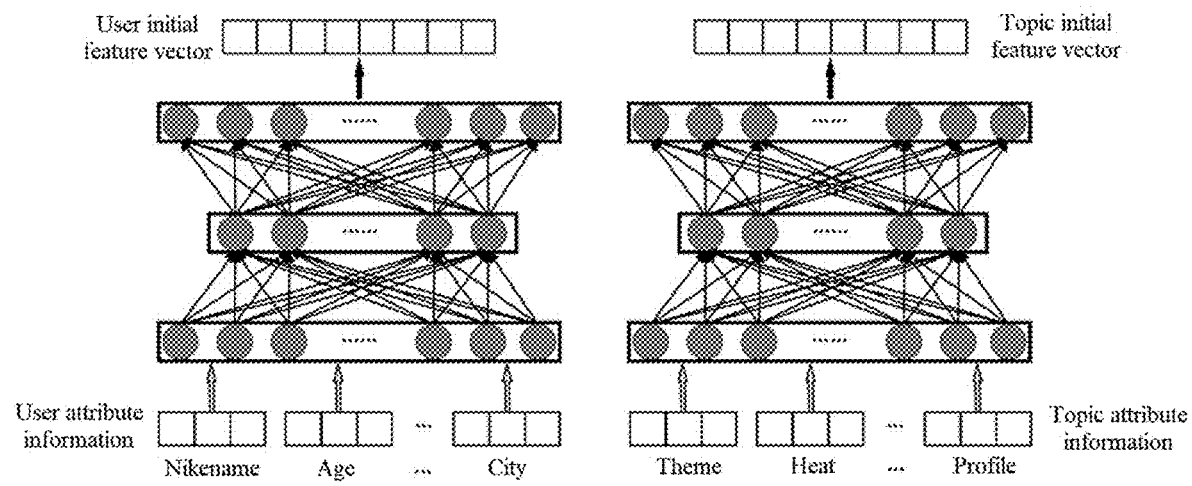
FIG. 2 illustrates a schematic operation diagram of initializing feature vectors by the multi-layer perceptron of the disclosure.

As illustrated in FIG. 2, a multi-layer perceptron initializes feature vectors, the multi-feature codes of the users and the multi-feature codes of the topics are respectively inputted into a multi-layer perceptron used to train user feature vectors and a multi-layer perceptron used to train topic feature vectors at the same time, and outputs the initial feature vectors of the users and the initial feature vectors of the topics, the initial feature vectors of the users and the initial feature vectors of the topics are as node feature vectors of the user nodes and node feature vectors of the topic nodes in the heterogeneous graph neural network.

A calculation formula for each layer of the multi-layer perceptron is that:

$$H^{(l)} = \phi(W^{(l)} \cdot H^{(l-1)} + b^{(l)}).$$

Where $H^{(l)}$ represents an output vector of the lth layer, $W^{(l)}$ represents a trainable weight matrix of the lth layer, $b^{(l)}$ represents a bias vector of the lth layer, $H^{l-1}$ represents an output vector of an upper layer of the lth later, when a current layer is a first layer, i.e., l=1 $H^{(l-1)}$ represents the multi-feature codes of the users and the multi-feature codes of the topics, ø represents an activate function, and is selected from one of Relu function and softmax function.

At the step S3, building a heterogeneous graph for the users and the topics.

Figure 3:
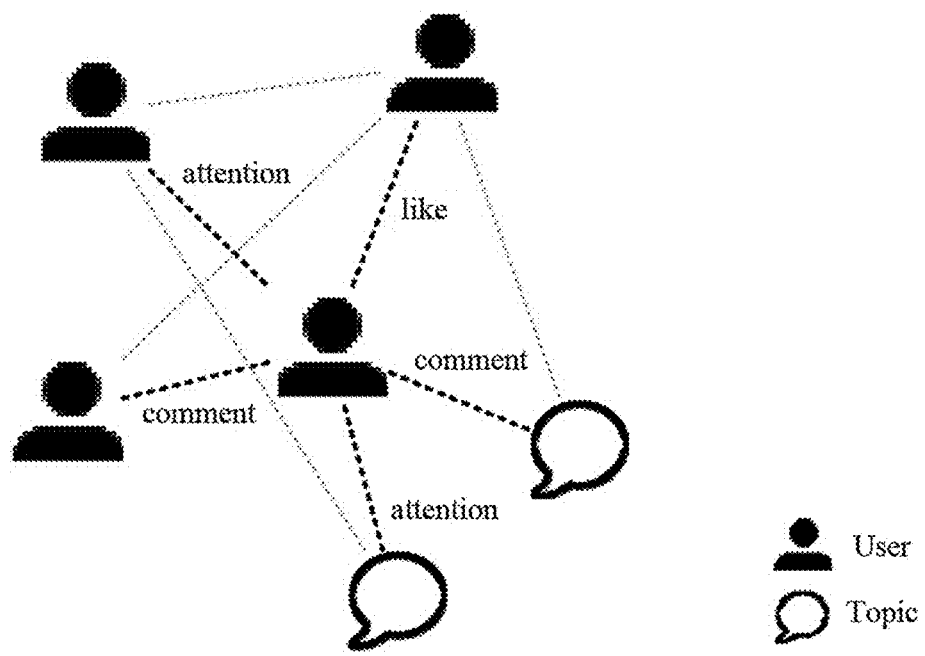
FIG. 3 illustrates a schematic diagram of establishing a heterogeneous graph by taking users and topics as nodes in the disclosure.

As illustrated in FIG. 3, considering the behavior features of the users in social networks, the users and the topics are used as nodes to establish the heterogeneous graph, and the users and the topics in social networks are used as nodes at the same time to establish the heterogeneous graph through user-user edge linking and user-topic edge linking. The condition of the user-user edge linking includes: when two users have interacted with each other including at least one of attentions, likes and comments, the edge linking is performed. The weight of the user-user edge is initialized to the number of times of attentions, likes and comments between the two users. After calculating the weights of all the user-user edges, the weight of each user-user edge is normalized. The condition of the user-topic edge linking includes: when the user has paid attention to and commented on the topic, the edge linking is performed. The weight of the user-topic edge is initialized to the number of times that the user pays attention to and comments on the topic. After calculating the weights of all the user-topic edges, the weight of each user-topic edge is normalized, the user-topic heterogeneity graph is obtained. This method fits the real structure of the real social network, pays attention to the most important user interaction and topics of interest to users in the social network, and pays attention to the fine-grained edge connection method of user specific operations, and considers user behavior characteristics more comprehensively and carefully, which helps to deeply integrate the features of users and their topics of interest in subsequent models.

MM max normalization is adopted for the normalization, and a calculation formula is that:

$$v_{normal} = \frac{v - v_{min}}{v_{max} - v_{min}}.$$

Where v represents an edge weight before the normalization, $v_{min}$ represents a minimum value of all edge weights before the normalization, $v_{max}$ represents a maximum value of all edge weights before the normalization, and $v_{normal}$ represents an edge weight after the normalization.

The user-user type edge weights and the user-topic type edge weights are normalized respectively. Compared with normalized together with the two types of edge weights, the disclosure helps to mitigate the differences between different types of edge weights, maintain the unique information of different types of edge weights, and better unify the operation of the following two types of edge weights.

At the step S4, building a heterogeneous graph neural network model.

Figure 4:
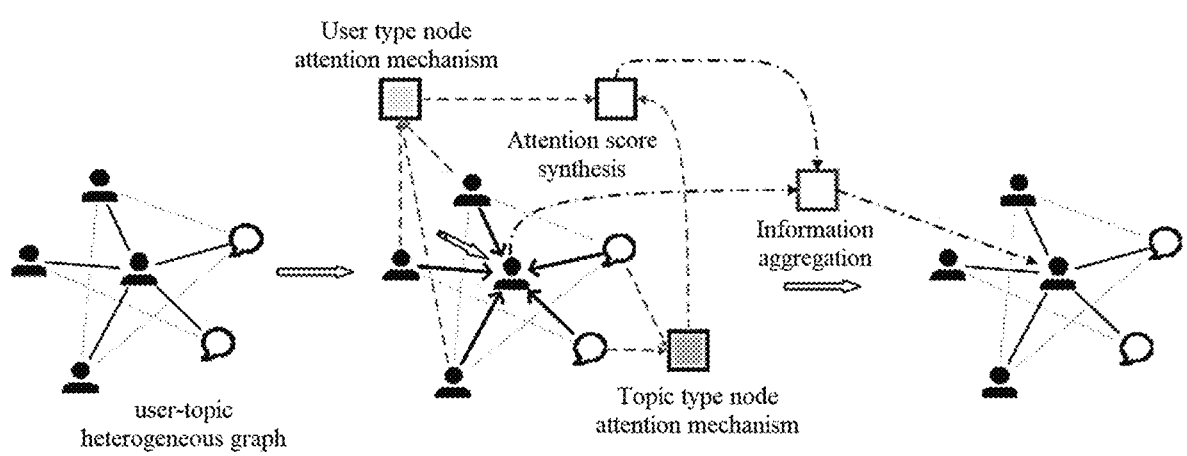
FIG. 4 illustrates a schematic operation diagram of a heterogeneous graph neural network of the disclosure.

As illustrated in FIG. 4, the user-topic heterogeneous graph is inputted into the heterogeneous graph neural network model, for the user type neighbor nodes and the topic type neighbor nodes, different attention vectors are used to calculate the attention scores through the attention mechanism, the two types of the attention scores (i.e., the attention score of the user type neighbor node and the attention score of the topic type neighbor node) are normalized separately and then normalized together, combining the attention score of each node in the two types, the information transfer and aggregation of the neighbor nodes are performed, and the updated vector representation of each user and topic after the information aggregation through the heterogeneous graph neural network is output.

At the step S4, the building the heterogeneous graph neural network model, includes the step S4.1 to step S4.3.

At the step S4.1, calculating attention scores of user type neighbor nodes and attention scores of topic type neighbor nodes.

For a central node of the information aggregation, its neighbor nodes may be user type nodes or topic type nodes. For two different types of neighbor nodes, their attention scores are calculated by their own attention mechanisms. The calculation formulas are as follows:

$$a_{vv_{user}} = \sigma(\mu_u^T \cdot [h_v \| h_{v_{user}}]), v_{user} \in N_v, \text{and represents the user type neighbor node};$$

$a_{vv_{topic}} = \sigma(\mu_u^T \cdot [h_v \| h_{v_{user}}]), v_{user} \in N_v$, and represents the topic type neighbor node.

Where v represents the central node of the information aggregation, $N_v$ represents the neighbor node set of v, $a_{vv_{user}}$ represents the attention score of the user type neighbor node, $a_{vv_{topic}}$ represents the attention score of the topic type neighbor node, $\mu_u^T$ represents a transpose of a learnable attention weight vector of the user type neighbor node, $\mu_u^T$ represents a transpose of a learnable attention weight vector of the topic type neighbor node, $h_v$ represents a feature vector of the central node, $h_{v_{user}}$ represents a feature vector of the user type neighbor node, $h_{v_{topic}}$ represents a feature vector of the topic type neighbor node, σ represents an activate function, $v_{user}$ represents the user type neighbor node in the neighbor node set, and $v_{topic}$ represents the topic type neighbor node in the neighbor node set of v.

At the step S4.2, synthesizing the attention scores.

The attention scores of the user type neighbor nodes and the topic type neighbor nodes are normalized respectively to obtain the normalized attention scores of their respective types, and then the attention scores of the neighbor node set of the central node are obtained through a softmax normalization synthesis to better maintain the distribution of attention scores of various types. The calculation formulas are as follows:

$$\theta_{vv_{user}} = \frac{\exp(a_{vv_{user}})}{\sum_{i \in N_v \text{ and } i \text{ represents a user node}} \exp(a_{vi})},$$

$v_{user} \in N_v$ and $v_{user}$ represents one of the user type neighbor nodes;

$$\theta_{vv_{topic}} = \frac{\exp(a_{vv_{topic}})}{\sum_{j \in N_v \text{ and } j \text{ represents a topic node}} \exp(a_{vj})},$$

$v_{topic} \in N_v$, and $v_{topic}$ represents one of the topic type neighbor nodes;

$$\theta_{vv'} = \frac{\exp(\theta_{vv'})}{\sum_{k \in N_v} \exp(\theta_{vk})},$$

and $v' \in N_v$;

where θ represents the attention score after the normalization by a softmax function, $\theta_{vv'}$ represents a value of a with row and v'th column of an attention score matrix, v' represents the neighbor node of v, $N_v$ represents the neighbor node set of v, $a_{vv_{user}}$ represents the attention score of the user type neighbor node, $a_{vv_{topic}}$ represents the attention score of the topic type neighbor node, $\theta_{vv_{user}}$ represents the attention score of a target user type neighbor node after the normalization, $\theta_{vv_{topic}}$ represents the attention score of a target topic type neighbor node after the normalization, $a_{vi}$ represents the attention score of the user type neighbor node before the normalization, $a_{vj}$ represents the attention score of the topic type neighbor node before the normalization, k represents a node of the neighbor node set of v, i represents the user type neighbor node of the neighbor node set of v, j represents the topic type neighbor node of the neighbor node set of v, and $\theta_{vk}$ represents the attention score of the neighbor node after the normalization.

At the step S4.3, information aggregation and updating.

Performing feature transfer on each neighbor node of the central node according to its attention score and aggregates with the features of the central node to update the feature representation of the central node, and a calculation formula is as follows:

$$h_i^{(l+1)} = \sigma(\Sigma_{j \in N(i)} \theta_{ij} \cdot h^{(l)} \cdot W^{(l)}).$$

Where $h_i^{(l+1)}$ represents a feature vector of the central node i in a node feature matrix of a (i+1)th layer of the heterogeneous graph neural network, $h^{(l)}$ represents a node feature matrix obtained by a ith layer of the heterogeneous graph neural network, when l=0, $h^{(0)}$ represents a matrix composed of node initial feature vectors, $W^{(l)}$ represents a trainable weight matrix of the ith layer of the heterogeneous graph neural network, $\theta_{ij}$ represents the attention score of the central node i and its neighbor node j, σ represents an activate function, and N(i) represents the neighbor node set of the central node i.

In the training process, the heterogeneous graph neural network model is jointly trained with the previous multilayer perceptron model, that is, the heterogeneous graph neural network model and the previous multilayer perceptron model share the back propagation loss in the training process, and update the parameters of the model at the same time.

The feature vector of each user node and the feature vector of each topic node after the information transmission and aggregation through the 1 layers of the heterogeneous graph neural network are updated into a user and topic database.

At the step S5, user and topic recommendation of the top☐k vector similarity.

For the target user to be recommended, the feature vector similarity between the target user and each user and the feature vector similarity between the target user and each topic are calculated. After sorting all the feature vector similarity, the top-k user and topic with the highest similarity are selected to recommend to the target user.

The calculation formula of the similarity is as follows:

$$similarity_{i,j} = \frac{F_i \cdot F_j}{\|F_i\| \times \|F_j\|} = \frac{\sum_{k=i}^{n}(F_i)_k \times (F_j)_k}{\sqrt{\sum_{k=1}^{n}(F_i)_k^2} \times \sqrt{\sum_{k=1}^{n}(F_j)_k^2}}.$$

Where $F_i$ represents a feature vector of the user i, $F_j$ represents a feature vector of the topic j, $similarity_{i,j}$ represents a vector similarity between the user i and the user j or the topic j, sorting the calculated vector similarity, and selecting the top☐k user and topic with the highest vector similarity for recommendation.

Embodiment 2

This embodiment provides a social recommendation system based on a multi-feature heterogeneous graph neural network, including: an information extracting module, a coding module, an initial feature vector outputting module, a heterogeneity graph building module, a heterogeneous graph neural network model building module, an attention score calculating module, an attention score synthesis calculating module, an information aggregation and updating module, a feature vector similarity calculating module, and a recommend result outputting module.

In this embodiment, the information extracting module is configured to simultaneously extract attribute information of users and attribute information of topics.

In this embodiment, the coding module is configured to code the attribute information of the users and the attribute information of the topics.

In this embodiment, the initial feature vector outputting module is configured to output initial feature vectors, input multi-feature codes of the users and multi-feature codes of the topics after the coding into different multi-layer perceptron to train, and output initial feature vectors of the users and initial feature vectors of the topics.

In this embodiment, the heterogeneity graph building module is configured to building a heterogeneity graph by taking the users and the topics on a social network as nodes, performing a user-user edge linking based on network social interactions of the users, performing a user-topic edge linking based on the topics of interest to the users, performing normalization on weights of user-user edges after calculating the weights of the user-user edges, and performing normalization on weights of user-topic edges after calculating the weights of the user-topic edges, and output the heterogeneity graph.

In this embodiment, the heterogeneous graph neural network model building module is configured to build a heterogeneous graph neural network model.

In this embodiment, the attention score calculating module is configured to input the heterogeneous graph into the heterogeneous graph neural network model, and calculate attention scores of user type neighbor nodes and attention scores of topic type neighbor nodes by using different attention vectors respectively.

In this embodiment, the attention score synthesis calculating module is configured to perform normalization on the attention scores of the user type neighbor nodes and the attention scores of the topic type neighbor nodes respectively and then perform normalization together to obtain attention scores of a neighbor node set of a central node.

In this embodiment, the information aggregation and updating module is configured to perform feature transfer on each of neighbor nodes of the neighbor node set of the central node based on the attention score of each of the neighbor nodes of the neighbor node set and then perform information aggregation together with features of the central node to update a feature representation of the central node, and output updated vector representations of the users and the topics after the information aggregation through the heterogeneous graph neural network.

In this embodiment, the feature vector similarity calculating module is configured to calculate feature vector similarity between a recommended target user and each of the users, and feature vector similarity between the target user and each of the topics.

In this embodiment, the recommend result outputting module is configured to output recommend results of the top-k user with a highest similarity and the top-k topic with a highest similarity after sorting the feature vector similarity.

The above embodiments are the preferred embodiments of the disclosure, but the embodiments of the disclosure are not limited by the above embodiments. Any other changes, amendments, replacements, combinations, and simplifications made without departing from the spiritual essence and principles of the disclosure shall be equivalent replacement methods, which are included in the protection scope of the disclosure.

What is claimed is:

1. A social recommendation method implemented by a computer processsor based on a multi-feature heterogeneous graph neural network, comprising:

extracting attribute information of users and attribute information of topics, and coding the attribute information of the users and the attribute information of the topics to obtain multi-feature codes of the users and multi-feature codes of the topics;

training a multi-layer perception for the users and a multi-layer perceptron for the topics by inputting the multi-feature codes of the users and the multi-feature codes of the topics into the multi-layer perceptrons respectively, and outputting initial feature vectors of the users and initial feature vectors of the topics;

building a heterogeneity graph by taking the users and the topics on a social network as nodes, performing a user-user edge linking based on network social interactions of the users, performing a user-topic edge linking based on the topics of interest to the users, performing normalization on weights of user-user edges after calculating the weights of the user-user edges, and performing normalization on weights of user-topic edges after calculating the weights of the user-topic edges; and outputting the heterogeneity graph;

building a heterogeneous graph neural network model;

inputting the heterogeneous graph into the heterogeneous graph neural network model, and calculating attention scores of user type neighbor nodes and attention scores of topic type neighbor nodes by using different attention vectors respectively;

performing normalization on the attention scores of the user type neighbor nodes and the attention scores of the topic type neighbor nodes respectively and then performing normalization together to obtain attention scores of a neighbor node set of a central node;

performing feature transfer on each of neighbor nodes of the neighbor node set of the central node based on the attention score of each of the neighbor nodes of the neighbor node set and then performing information aggregation together with features of the central node to update a feature representation of the central node, and outputting updated vector representations of the users and the topics after the information aggregation through the heterogeneous graph neural network; and calculating feature vector similarity between a recommended target user and each of the users, and feature vector similarity between the target user and each of the topics, selecting one of the users with a highest similarity and one of the topics with a highest similarity after sorting the feature vector similarity to recommend to the target user;

wherein calculating each layer of the multi-layer perceptrons comprises a calculation formula:

$$H^{(l)}=\phi(W^{(l)} \cdot H^{(l-1)}+b^{(l)});$$

wherein $H^{(l)}$ represents an output vector of a lth layer; $W^{(l)}$ represents a trainable weight matrix of the lth layer; $b^{(l)}$ represents a bias vector of the lth layer; $H^{(l-1)}$ represents an output vector of a (l−1)th layer, and when l=1, $H^{(l-1)}$ represents the multi-feature codes of the users and the multi-feature codes of the topics; and ø represents an activate function.

2. The social recommendation method based on the multi-feature heterogeneous graph neural network according to claim 1, wherein the coding the attribute information of the users and the attribute information of the topics, comprises:

coding semantic information related to natural language by using a word2vec method, comprising: noise information removal, word segmentation and stop word processing, training word representations of numerical vectorization and obtaining embedding coding representations of the semantic information; and performing one-hot coding on data represented by discrete values.

3. The social recommendation method based on the multi-feature heterogeneous graph neural network according to claim 1, wherein the performing a user-user edge linking based on network social interactions of the users, comprises:

when two of the users have carried out the network social interactions, performing the user-user edge linking on the two of the users;

wherein the network social interactions comprise at least one of interactions of attentions, likes and comments; and wherein the weight of the user-user edge between the two of the users is initialized to a number of times of the network social interactions between the two of the users.

4. The social recommendation method based on the multi-feature heterogeneous graph neural network according to claim 1, wherein the performing a user-topic edge linking based on the topics of interest to the users, comprises:

when one of the users has paid attention to and commented on one of the topics, performing the user-topic edge linking on the one of the users and the one of the topics;

wherein the weight of the user-topic edge between the one of the users and the one of the topics is initialized to a number of times that the one of the users pays attention to and comments on the one of the topics.

5. The social recommendation method based on the multi-feature heterogeneous graph neural network according to claim 1, wherein the calculating attention scores of user type neighbor nodes and attention scores of topic type neighbor nodes by using different attention vectors respectively through calculation formulas as follows:

$$a_{vv_{user}}=\theta(\mu_u^T\cdot[h_v\|h_{v_{user}}]), v_{user}\in N_v, \text{and } v_{user} \text{ represents one of the user type neighbor nodes;}$$

$$a_{vv_{topic}}=\theta(\mu_u^T\cdot[h_v\|h_{v_{user}}]), v_{user}\in N_v, \text{and } v_{topic} \text{ represents one of the user type neighbor nodes;}$$

where v represents the central node of the information aggregation, $N_v$ represents the neighbor node set of v, $a_{vv_{user}}$ represents the attention score of one of the user type neighbor nodes, $a_{vv_{topic}}$ represents the attention score of one of the topic type neighbor nodes, $\mu_u^T$ represents a transpose of a learnable attention weight vector of one of the user type neighbor nodes, $\mu_u^T$ represents a transpose of a learnable attention weight vector of one of the topic type neighbor nodes, $h_v$ represents a feature vector of the central node, $h_{v_{user}}$ represents a feature vector of one of the user type neighbor nodes, $h_{v_{topic}}$ represents a feature vector of one of the topic type neighbor nodes, θ represents an activate function, $v_{user}$ represents one of the user type neighbor nodes in the neighbor node set of v, and $v_{topic}$ represents one of the topic type neighbor nodes in the neighbor node set of v.

6. The social recommendation method based on the multi-feature heterogeneous graph neural network according to claim 1, wherein the performing normalization on the attention scores of the user type neighbor nodes and the attention scores of the topic type neighbor nodes respectively and then performing normalization together to obtain attention scores of a neighbor node set of a central node through calculation formulas as follows:

$$\theta_{vv_{user}} = \frac{\exp(a_{vv_{user}})}{\sum_{i\in N_v \text{ and } i \text{ represents a user node}} \exp(a_{vi})},$$

$v_{user} \in N_v$, and $v_{user}$ represents one of the user type neighbor nodes;

$$\theta_{vv_{topic}} = \frac{\exp(a_{vv_{topic}})}{\sum_{j\in N_v \text{ and } j \text{ represents a topic node}} \exp(a_{vj})},$$

$v_{topic} \in N_v$, and $v_{topic}$ represents one of the topic type neighbor nodes;

$$\theta_{vv'} = \frac{\exp(\theta_{vv'})}{\sum_{k\in N_v} \exp(\theta_{vk})},$$

and $v' \in N_v$;

where θ represents the attention score after the normalization by a softmax function, v represents the central node of the information aggregation, $N_v$ represents the neighbor node set of v, v' represents a neighbor node of v, $\theta_{vv'}$ represents a value of a vth row and v'th column of an attention score matrix, $a_{vv_{user}}$ represents the attention score of one of the user type neighbor nodes, $a_{vv_{topic}}$ represents the attention score of one of the topic type neighbor nodes, $\theta_{vv_{user}}$ represents the attention score of a target user type neighbor node after the normalization, $\theta_{vv_{topic}}$ represents the attention score of a target topic type neighbor node after the normalization, $a_{vi}$ represents the attention score of one of the user type neighbor nodes before the normalization, $a_{vj}$ represents the attention score of one of the topic type neighbor nodes before the normalization, k represents a node of the neighbor node set of v, i represents the user type neighbor node of the neighbor node set of v, j represents the topic type neighbor node of the neighbor node set of v, and $\theta_{vk}$ represents the attention score of the neighbor node after the normalization.

7. The social recommendation method based on the multi-feature heterogeneous graph neural network according to claim 1, wherein the performing feature transfer on each of neighbor nodes of the neighbor node set of the central node based on the attention score of each of the neighbor nodes of the neighbor node set and then performing information aggregation together with features of the central node to update a feature representation of the central node through a calculation formula as follows:

$$h_i^{(l+1)}=\theta(\Sigma_{j\in N(i)}\theta_{ij}\cdot h^{(l)}\cdot W^{(l)}),$$

where $h_i^{(l+1)}$ represents a feature vector of the central node i in a node feature matrix of a (i+1)th layer of the heterogeneous graph neural network, $h^{(l)}$ represents a node feature matrix obtained by a ith layer of the heterogeneous graph neural network, $W^{(l)}$ represents a trainable weight matrix of the ith layer of the heterogeneous graph neural network, $\theta_{ij}$ represents the attention score of the central node i and a neighbor node j, θ represents an activate function, and N (i) represents the neighbor node set of the central node i.

8. The social recommendation method based on the multi-feature heterogeneous graph neural network according to claim 1, wherein the heterogeneous graph neural network model is jointly trained with the multi-layer perceptrons to share a back propagation loss in a training process and update parameters at the same time; and wherein feature vectors of each of user nodes and each of topic nodes after the feature transfer and the information aggregation through the heterogeneous graph neural network with multiple layers are updated into a user and topic database.

\* \* \* \* \*